No. 699,162. Patented May 6, 1902.
E. F. FROST.
TELEPHONE CIRCUIT SYSTEM.
(Application filed Nov. 13, 1900.)
(No Model.)
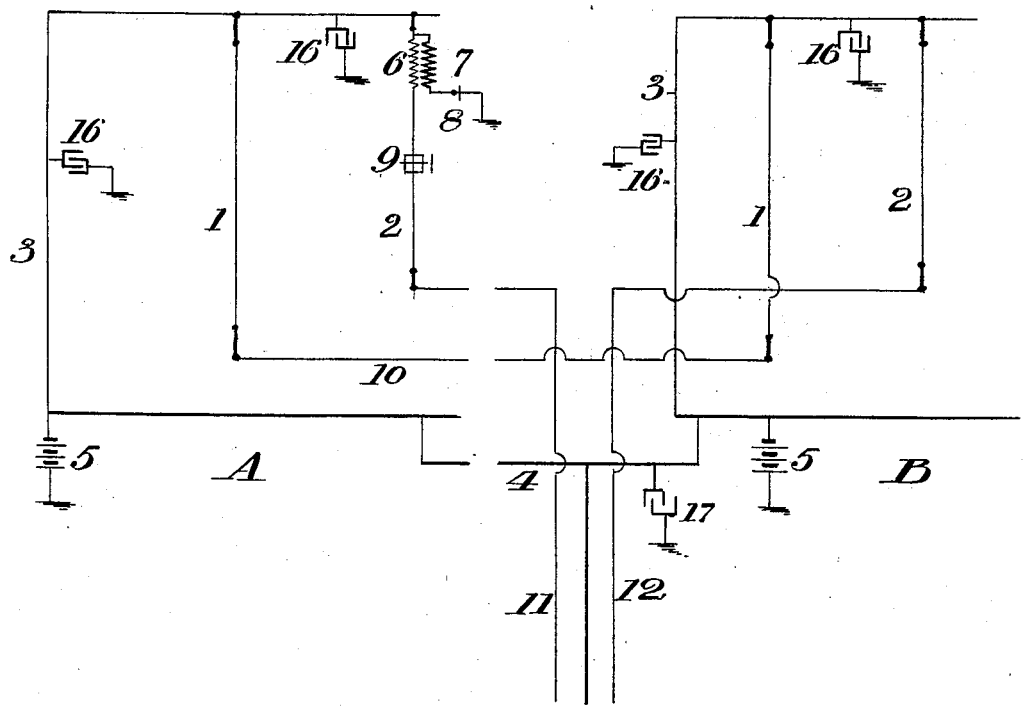
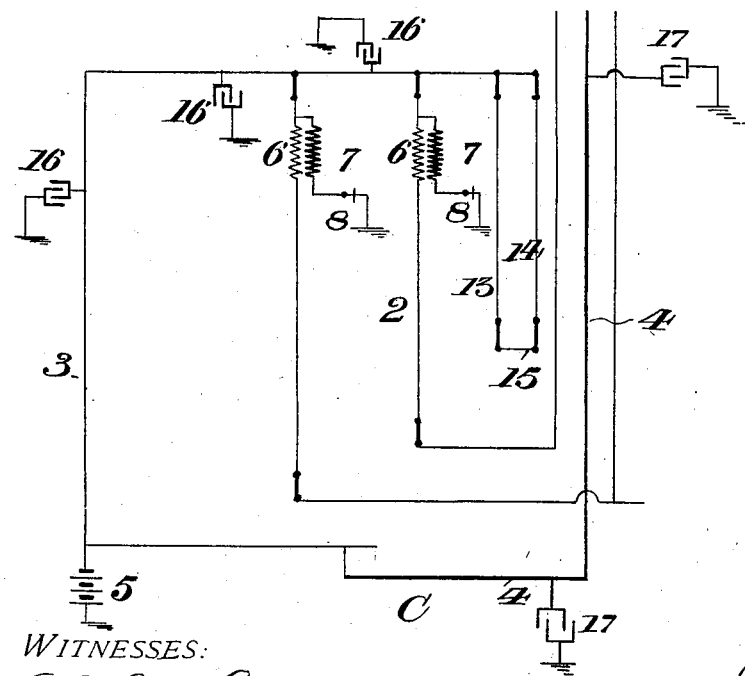
WITNESSES:
L. C. Hills
M. R. Taylor.
INVENTOR
Ellis F. Frost

UNITED STATES PATENT OFFICE.

ELLIS F. FROST, OF WASHINGTON, DISTRICT OF COLUMBIA.

TELEPHONE-CIRCUIT SYSTEM.

SPECIFICATION forming part of Letters Patent No. 699,162, dated May 6, 1902.

Application filed November 13, 1900. Serial No. 36,420. (No model.)

*To all whom it may concern:*

Be it known that I, ELLIS F. FROST, a citizen of the United States, residing at Washington, in the District of Columbia, have invented certain new and useful Improvements in Telephone-Circuit Systems; and I do hereby declare the following to be a full, clear, and exact description of the invention, such as will enable others skilled in the art to which it appertains to make and use the same.

My invention relates to telephone-circuit systems.

The object of my invention is to produce in a telephone system a means for the complete metallic return of each circuit, which return shall be common to a plurality of telephone-lines and also serve as a battery-supply circuit, but which means shall have a static capacity sufficient to cause the same to act as an artificial earth by reason of an inductive connection to the earth through condensers.

My invention consists in a telephone-circuit system comprising telephone-lines, trunk-lines, a common return or battery-supply line, and means for establishing the said common return or battery-supply line in inductive relation to the earth through inductive apparatus of high static capacity as a condenser.

Reference being made to the accompanying drawing, my invention is more particularly described as follows:

A, B, and C represent three of any number of telephone-exchanges. At each exchange a plurality of telephone-lines extend between the central-exchange office and the various subscribers' stations, as the telephone-lines 1 and 2 in each of the exchanges A, B, and C. From each exchange a line 3 of comparatively low resistance extends to each subscriber of that exchange. This line serves as a common return for all the lines of its exchange. All of these common return-lines 3 are connected together by the common return trunk-line 4. At each exchange there is a source of electric energy, as an electric battery 5, one pole of which is connected to the earth, the other pole of which is connected to the common return-line 3, thus making the line 3 a battery-supply line. In other words, the line 3 is a common source of electric-current supply to all the subscribers' stations to which the said line extends. In the figure all the telephones are shown as connected for talking, in which case the telephone-line is connected to the common return or battery-supply line. As more particularly shown in telephone-line 2 of exchange A, in which the telephone-line 2 on entering the subscriber's station passes through the telephone-receiver 9 and the secondary winding 6 of an induction-coil and thence connects with the common return-line 3, the telephone-line includes the secondary winding 6 of an induction-coil, the primary winding 7 of which is connected to the line and to the earth through a microphone-transmitter 8. Also the line includes the magneto-telephone receiver 9. As shown in the figure, two telephone-lines of each exchange are shown connected—namely, telephone-line 1 of exchange A is connected to telephone-line 1 of exchange B by the connecting trunk-line 10, extending between the exchanges A and B. Telephone-line 2 of exchange A is connected to telephone-line 2 of exchange C by the connecting trunk-line 11, extending between the exchanges A and C. Also telephone-line 2 of exchange B is connected with telephone-line 1 of exchange C by the connecting trunk-line 12, extending between exchanges B and C. Any two telephone-lines of any one exchange may also be connected, as shown in exchange C, where the telephone-lines 13 and 14 are shown connected at the central office C by the connecting line or cord circuit 15, and at the subscribers' stations they are connected by the common return or battery-supply line 3. It will be seen from the figure that the various telephone-lines as connected are each in complete metallic circuit, the circuits being completed by the common return-lines and the common return trunk-lines. The common return and the common return trunk lines should be of a resistance relatively low compared to that of the telephone-lines, so as to reduce all tendency to cross-talk to a negligible quantity. When a telephone-line is connected for talking purposes—that is, when the telephone-line is connected to the common return or battery-supply line—the battery-supply line is connected to earth through the primary winding 7 of the induction-coil and the microphone-transmitter 8. This completes an earth return-circuit for the battery 5 over the battery-supply line 3. If two or more telephone-lines are thus connected, it would result that more or less cross-talk would obtain between the various subscribers' stations over the common return or battery-supply line 3. To overcome this, I connect the battery-line 3 to the earth inductively in such manner as to give the line 3 a sufficiently great static capacity. This is accomplished by means of condensers, one side of which is connected to the earth and the other side of which is connected to the line 3, as shown at 16 in the figure. A sufficient number of condensers is used and so distributed along the line as to insure a great static capacity to the line. The line 4, connecting the common return-line 3 of the various central exchanges, and which forms a part of the common return-line when a telephone-line of one exchange is connected with that of another exchange, as described above, may also be connected inductively to the earth by means of condensers suitably distributed along the same. This is shown in the figure by the condensers 17, one side of which connects with the line 4 and the other side with the earth. A physical analogy will serve to illustrate the action of this procedure. Let there be a tank of, say, ten gallons capacity, and let there be a number of pipes extending from the tank. If the tank contains water and the discharge of the water through a pipe be frequently interrupted, then the other pipes will feel the interruption in their discharge. Now if the tank be made of great capacity with reference to the discharge-power of the pipes the frequent interruption to the discharge of a pipe will no longer affect the discharge of the other pipes. Leaving the analogy, except for very short distances and under favorable conditions the earth does not serve as a return for a circuit connected to the earth at both ends. In other words, no flow of electricity takes place through the earth between the ends of the line. The earth only serves as a vast reservoir of an infinite capacity whose state at one place is kept in equilibrium with that of another, however disturbed, not by a current flow through the earth, but by an adjustment of the capacities between the places through inductive relation.

It is well known that owing to the static capacity of submarine cables a considerable retardation in the transmission of electrical impulses obtains. This is owing to the condenser action of the cable, in which the line acts as the inside coating of a Leyden jar and the sheath and the ocean as the outside coating. The ocean as the outside coating serves to connect the line of the cable to the earth through inductive relation and by reason of its enormous static capacity tends to absorb the variations in the electric state of the line, so that when the electric impulses in the line exceed a certain frequency they become retarded to such an extent as to be blended or run together and they no longer remain distinct, and so with the common return-line when connected to the earth by condensers. The return-line becomes of such capacity that the variations are absorbed so completely that as distinct variations they cannot affect any telephone-line connected to the common return. This action is in addition to that above described with reference to the voice-currents taken up by the common return-line as an artificial earth and has particular reference to the common return-line when used as a battery-supply line for the transmitters of the various subscribers' stations. This retarding effect of the condensers prevents the variations of the battery-current due to the action of the transmitter from traversing the common return-line and affecting the battery-supply to another telephone-line. In other words, there can be no cross-talk over the battery-supply line.

There is another important result due to the use of condensers as above described. A disturbing factor on grounded telephone-lines is often due to sneak-currents. For instance, electric-railway currents are disseminated throughout the earth and find their way over grounded telephone-lines in the neighborhood. As the result of the use of condensers on the common return-line as described these sneak-currents may be taken up by the condenser in their neighborhood; but owing to the high capacity of the common return-line, due to the condensers, these currents soon find their return to earth and the common return-line is maintained in a neutral state. In fact, a continual balanced adjustment of all disturbing potentials is maintained by inductive relation of the common return-line to the earth by means of condensers. Moreover, owing to the retarding effect of the condenser on currents of comparatively high frequency the disturbances due to these frequencies are eliminated by being "ironed out," so to say.

Since the condensers add to the capacity of the common return-line, it would follow that if this capacity were insufficient there would be voice-currents passing from the common return-line to the telephone-lines, which currents, due to the trailing effect of the insufficient capacity, would more or less confuse conversation. On the other hand, if the capacity of the common return-line is sufficiently great, the voice-currents will be completely "trailed," so that they will not escape from the common return-line to the telephone-line as voice-currents, such current as may pass from the common return-line to the telephone-line being inoperative as voice-currents and totally unable to interfere with the voice-currents passing from the telephone-line to the common return-line. In fact, the greater contrast there is between the telephone-line and the return-line in regard to capacity and inductance the greater the benefit therefrom, and it is therefore my object to give the return-line that high capacity, taking care at the same time not to reduce the inductance of the telephone-line. By thus making an "artificial earth," so to say, I practically decrease the resistance of the metallic circuit to that of a circuit grounded at both ends, this so far as voice-currents are concerned.

Another advantage arising from the use of condensers connected as described is that their armatures, which are connected to the common return-line, become charged by the battery connected to the common return-line, and therefore serve as a subsidiary source of current-supply for the various telephone-circuits connected to the said common return-line.

The common return-line might under favorable circumstances be given a high capacity by being buried under earth or water, but insulated therefrom.

The gist of my invention is in the employment of means suitable to give a vast capacity to the common return or battery-supply line—in fact, to make the common return or battery-supply line a complete substitute for the earth—in fact, an artificial earth. It is necessary at the same time the increased capacity is given to the common return or battery-supply line that the resistance of the said line be not increased. This is all accomplished by the use of condensers appropriately distributed along the line, one side of the condensers being connected to the earth, the other side being connected to the line, as shown in the figure.

I claim—

1. In a telephone-circuit system, a plurality of telephone-lines, a common return or battery-supply line, combined with a condenser, one side of which is connected to the earth, the other side of which is connected to the common return or battery-supply line, for the purposes specified.

2. In a telephone-circuit system, a plurality of telephone-lines, a common return or battery-supply line, a source of electric energy one pole of which is connected to the earth the other pole of which is connected to the common return or battery-supply line, combined with a condenser one side of which is connected to the earth the other side of which is connected to the said common return or battery-supply line for the purposes specified.

3. In a telephone-circuit system, a condenser, a telephone-circuit comprising a telephone-line and a common return-line, the latter of which is connected to the earth through said condenser.

4. In a telephone-circuit system, a telephone-circuit comprising a telephone-line and a common return-line, the latter of which is of relatively high static capacity to that of the former.

5. In a telephone-circuit system, a telephone-circuit comprising a telephone-line and a common return-line, the latter of which is of relatively high static capacity and low inductance to that of the former.

In testimony whereof I affix my signature in presence of two witnesses.

ELLIS F. FROST.

Witnesses:
L. C. HILLS,
KARL H. BUTLER.